United States Patent
Mazelsky

[11] 3,767,225
[45] Oct. 23, 1973

[54] CONSTRUCTION FOR SAFETY AIR CUSHION SYSTEM COMPRISING DUAL BAGS, NOZZLE, AND AIR ASPIRATION

[76] Inventor: Bernard Mazelsky, 2106 Dancove Dr., W. Covina, Calif.

[22] Filed: Aug. 31, 1970

[21] Appl. No.: 68,444

[52] U.S. Cl. ........ 280/150 AB, 137/525.1, 141/100
[51] Int. Cl. ............................................ B60r 21/10
[58] Field of Search .................. 280/150 AB, 150 B; 244/31, 138; 137/525.3, 525.1; 206/DIG. 30; 141/100, 10, 189, 191

[56] References Cited
UNITED STATES PATENTS

| | | | |
|---|---|---|---|
| 3,582,107 | 6/1971 | Goetz et al. | 280/150 |
| 2,418,798 | 4/1947 | Whitmer | 280/150 X |
| 3,532,360 | 10/1970 | Leising et al. | 280/150 |
| 3,276,726 | 10/1966 | Webb | 244/31 |
| 1,370,178 | 3/1921 | Albert | 137/525.3 |
| 2,834,606 | 5/1958 | Bertrand | 280/150 |
| 2,772,829 | 12/1956 | Crawford et al. | 417/189 X |
| 3,056,540 | 10/1962 | Marsh et al. | 417/191 X |
| 3,508,724 | 4/1970 | Scher et al. | 244/31 |
| 3,514,124 | 5/1970 | Richardson | 280/150 AB |
| 3,586,347 | 6/1971 | Carey et al. | 280/150 AB |
| 3,610,657 | 10/1971 | Cole | 280/150 AB |
| 3,624,810 | 11/1971 | Hass | 280/150 AB |
| 1,041,216 | 10/1912 | Woods | 137/525.1 X |
| 2,644,663 | 7/1953 | Klingler | 137/525.1 |
| 2,974,912 | 3/1961 | Namsick | 244/138 R |

FOREIGN PATENTS OR APPLICATIONS 896,312   11/1953   Germany ............................ 280/150

*Primary Examiner*—Kenneth H. Betts
*Attorney*—Herzig & Walsh

[57] ABSTRACT

The invention is an improvement in inflatable air cushion systems for use as devices to protect passengers in vehicles. Pressure is transferred from an elongated gas container through a nozzle to an inflatable bag or envelope for inflating it. Openings are formed for transferring gas from the container through the nozzle by means of an explosive charge. The improvements of the herein invention reside in that the dual bags are provided including a second positioned to prevent the motion of the passenger's legs which in turn prevents "submarining" of the occupant. The nozzle is dual to simultaneously inflate both bags. The large bag is provided with a flutter valve through which air is aspirated to assist in inflating the bag to thereby reduce the volume of pressurized air required for inflating.

6 Claims, 7 Drawing Figures

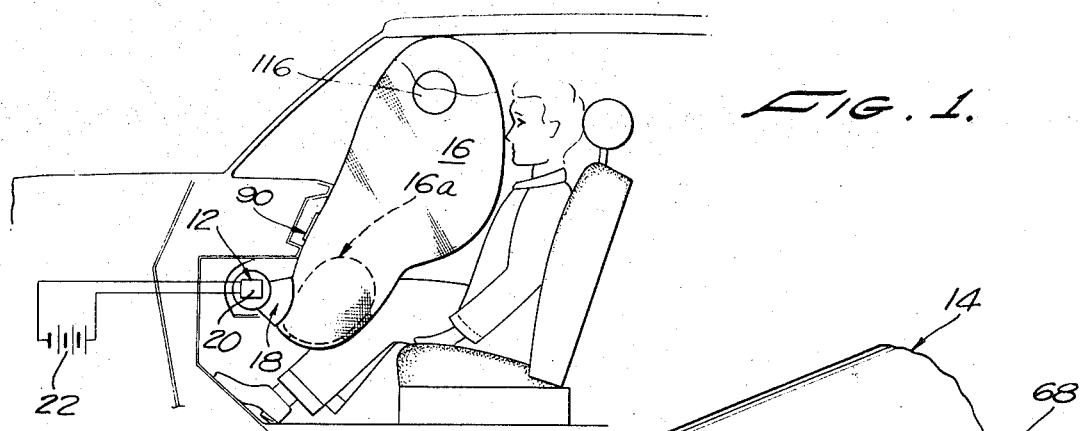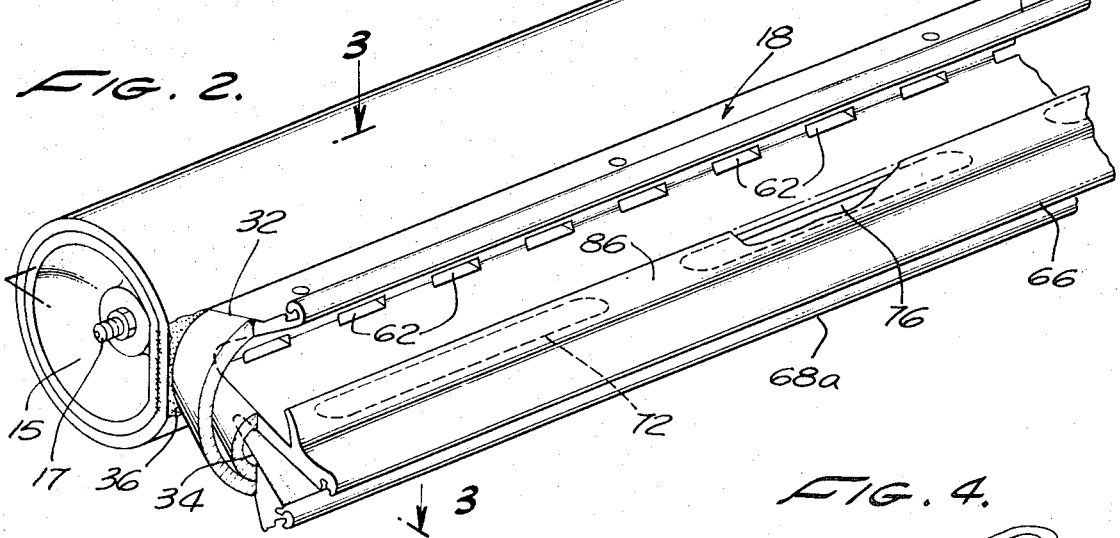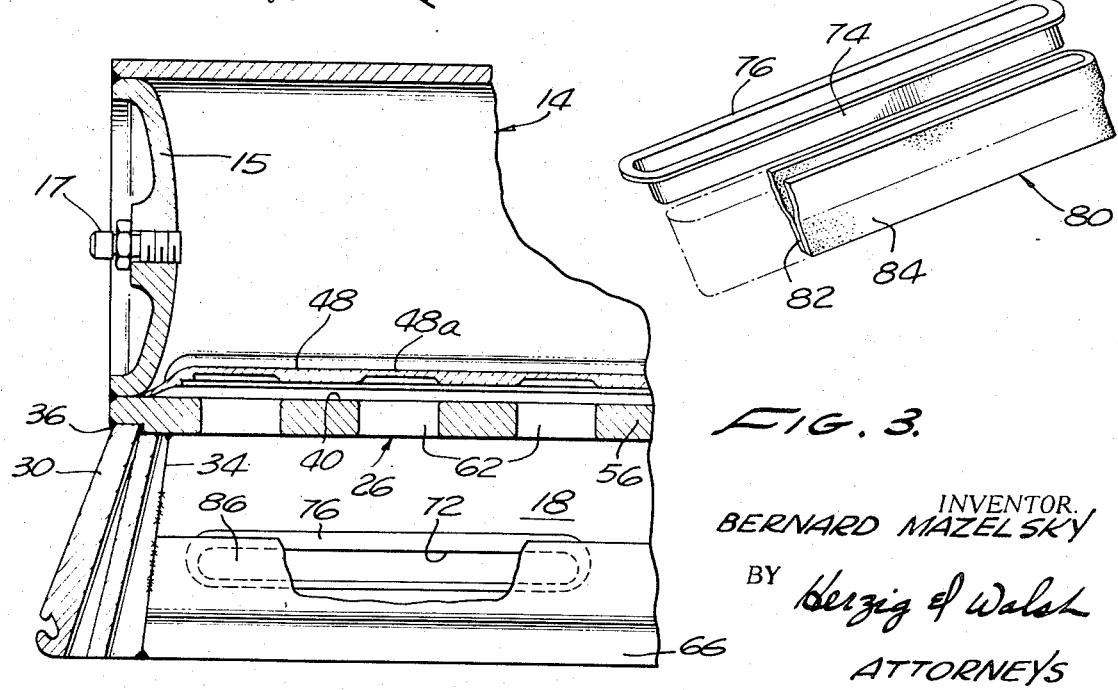

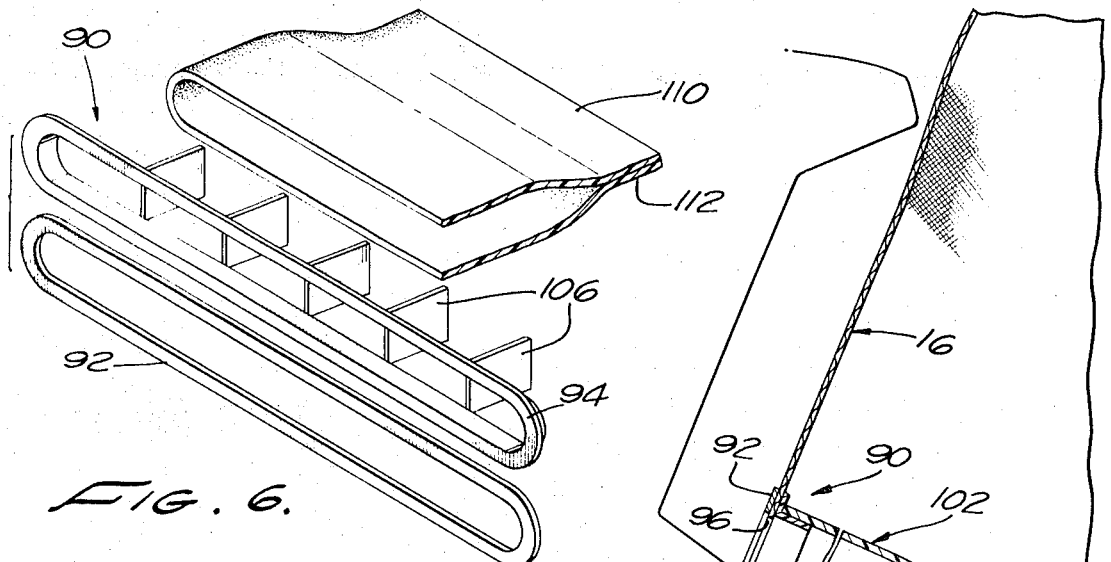
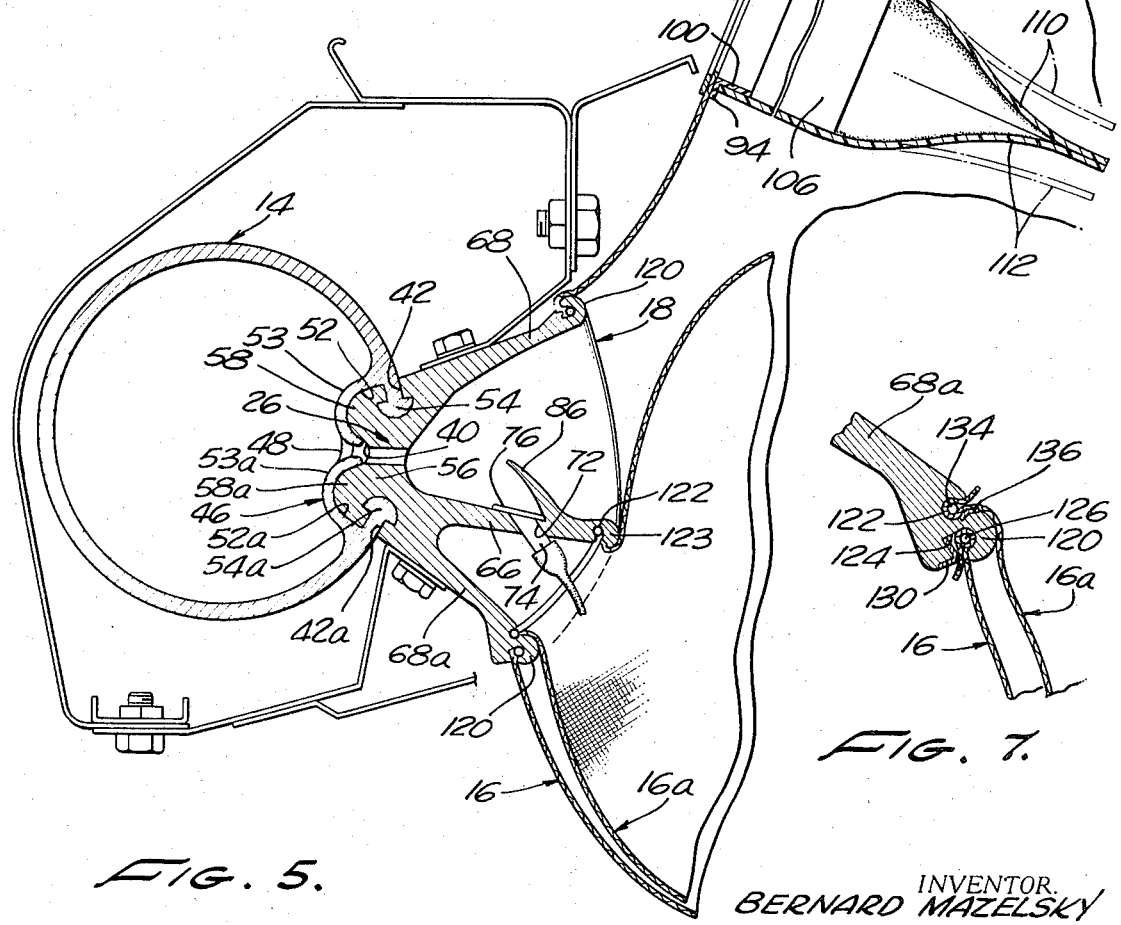

CONSTRUCTION FOR SAFETY AIR CUSHION SYSTEM COMPRISING DUAL BAGS, NOZZLE, AND AIR ASPIRATION

SUMMARY OF THE INVENTION

The invention is directed to improvements in inflatable safety air cushion systems of the type adapted for use in vehicles to protect passengers in the event of accidents.

A system of this type is disclosed in the application of the herein inventor, Ser. No. 885,601 filed Dec. 16, 1969, now U.S. Pat. No. 3,680,886. In the system of the prior application, an elongated tank is provided with elongated transfer means in the form of a nozzle for transferring gas from the tank to the inflatable bag or envelope. A relatively thin diaphragm is formed in the tank which is ruptured or opened by an explosive charge for transferring gas to the inflatable envelope.

The herein invention provides improvements in the safety system. In the improved system, dual inflatable bags or envelopes are provided. More specifically, a second inflatable bag or envelope is provided which is smaller and which is inflated in a position in front of or ahead of a passenger's legs to give him adequate protection in that area. The second and smaller bag is preferably one that is inflated to be harder or firmer in order to effectuate its purpose. An improved nozzle is provided and constructed to accommodate the system to the additional bag. The nozzle is provided with an intermediate septum dividing it into two parts so that one bag is inflated by a flow of gas through one part of the nozzle and the other bag is inflated by a flow of gas through the other part of the nozzle. A passageway is provided through the septum of the nozzle and controlled by a flutter valve so that inflating gas can pass through this passageway for purposes of inflating the smaller bag. This construction minimizes modifications necessary to adapt or accommodate the system to the second bag.

Additional improvements in the system residing in that the larger bag is provided with an aspirator valve through which adjacent air is aspirated into the bag to assist in inflating it upon initial inflation of the bag by detonation of the explosive charge and the beginning of the transfer of gas into the bag. The aspirator means is preferably in the form of a flutter valve. This improved construction makes it possible to inflate the bag to the required pressure and within the required time with less pressure in the pressure supply tank since a substantial part of the inflating volume is aspirated in from adjacent air.

In the light of the foregoing, the objects of the invention will be readily apparent to those skilled in the art. A primary object is to enhance the utility and effectiveness of safety systems of this type by providing protection not only for the upper part of the passenger's body, but also to prevent "submarining" of the body.

Another object is to provide means for effectuating the previously stated object comprising a second additional inflatable envelope or bag which is inflatable from the same source of pressure and through the same transfer nozzle means modified to accommodate the purpose.

Another object is to provide transfer nozzle means adapted to serve the purposes of the preceding object comprising a transfer nozzle having an intermediate septum with a passageway therethrough so that upon detonation of the charge which opens the gas passageways, inflating gas can flow into both of the inflatable bags or envelopes.

Another object is to provide improved means for inflating a bag or envelope in a system of the type described by way of aspirating external air into the bag for inflating it upon initial transfer of inflating gas to the envelope through the transfer nozzle.

Another object is to provide aspirating means as in the foregoing object comprising a passageway in the inflatable envelope controlled by a flutter valve.

BRIEF DESCRIPTION OF THE DRAWINGS

Further objects and additional advantages of the invention will become apparent from the following detailed description and annexed drawings wherein:

FIG. 1 is a pictorial view showing the installed position of the safety inflatable air cushion device in a vehicle;

FIG. 2 is a perspective view, partly broken away, of the dual nozzle of the invention;

FIG. 3 is a section view taken along the line 3—3 of FIG. 2;

FIG. 4 is a detail view of the aspirator flutter valve;

FIG. 5 is a sectional view of the tank nozzle and bag assembly;

FIG. 6 is a perspective view of the aspirator flutter valve; and

FIG. 7 is a detailed view of the securement of the bags to the nozzle.

DESCRIPTION OF THE PREFERRED EMBODIMENT

FIG. 1 illustrates a typical installation illustrating a safety device or system as indicated at 12. Upon being activated, the device inflates to a position or positions as illustrated in FIG. 1. As shown in FIG. 2, the gas container 14 of the device is cylindrical, larger bag 16 and smaller bag 16a normally being folded or collapsed with the diffuser nozzle 18 between the container and the folded bags. The arrangement as shown is preferable to arrangements wherein the gas container is within a bag.

The system is controlled by a deceleration responsive sensor that may be mounted on the tank as shown whereby to respond rapidly to deceleration forces when the vehicle enters an impact situation. Sensor 20 may be of a convention or typical type energizable by way of battery 22 or may be of a type as shown in application Ser. No. 65,019 filed on Aug. 19, 1970, now U.S. Pat. No. 3,708,181, this application having common ownership with the herein application now U.S. Pat. No. 3,708,181.

FIG. 1 shows the larger bag 16 inflated in a position in front of the passenger. The bag, of course, may have a transverse dimension sufficient to provide safety for one or more passengers in the front seat. The smaller bag 16a is preferably firmer and inflates into a position ahead of the passenger's legs.

FIGS. 2, 3, 4, and 5 shows a preferred arrangement of the parts. The diffuser nozzle 18 has a rear part 26, the diffuser diverging as shown to the bags 16 and 16a. As may be seen, the tank or container 14 is elongated as is the diffuser nozzle 18 extending along the length of the bags. The gas container and diffuser nozzle can of course be made to be less than or coextensive in length with the bags. Tank 14 is cylindrical having welded hemispherical ends as shown at 15 for maximum strength. The ends are concave as shown. Numeral 17 designates a threaded fitting in the end or head 15.

The tank 14 and the nozzle 18 are fabricated as separate parts and in the preferred form of the invention, the parts as shown in FIG. 5 are extrusions formed of suitable material for the purpose. The use of the extrusion process in the fabrication of course facilitates production. The nozzle assembly includes two end pieces, one of which is designated by the numeral 30 in the figures. These pieces are curved as shown, and these pieces are secured to straight edges as shown at 32 and 34 at the ends of the main nozzle part and they are secured to the tank 14 by welding as shown at 36 in FIG. 2.

The tank 14 and the nozzle 18 are mutually configurated as may be seen in FIG. 5 to provide a tongue and groove joint as between these parts. The joint can be made by sliding these parts relatively axially with respect to each other. It will be observed that the base part of the nozzle 18 has an inward arcuate depression as may be seen at 40. On opposite sides, it has the grooves as shown at 42 and 42a, extending along its length. Both of these grooves are dovetailed at the base part of the groove as may be seen. The tank 14 on that side on which the nozzle is joined is formed as may be observed at 46. At the inside of this portion, is an arcuate depression 48 extending along the length of the tank. The portion 46 is formed to provide openings or receptacles designated at 52 and 52a. The openings are within parts 53 and 53a. The tank 14 has extending dovetailed tongues 54 and 54a which are shaped to be received and to fit into the dovetailed grooves 42 and 42a in the nozzle base 26. The nozzle 18 has a neck part which is between the openings or grooves 42 and 42a as designated at 56 and extending from this narrow part are extensions or tongues as designated at 58 and 58a which are shaped to be received in the openings or grooves 52 or 52a in the tank 14. As pointed out, the joint between the tank 14 and the nozzle 18 may be formed by sliding these parts relatively to each other axially to form a joint as shown in FIGS. 2 and 5. It will be observed that the recess 48 is formed in the part 26 of the tank 14 that register with the arcuate recess 40 in the nozzle 18.

As pointed out, the nozzle 18 is formed by extrusion. After being extruded, spaced elongated holes or openings as designated at 62 are formed in the narrow neck portion 56 of the nozzle as shown. These openings may be readily formed by means of conventional machine tools which simply punch these holes or openings in spaced positions. These openings are for the transfer or transmission of gas under pressure from the tank into the envelope for inflating as will be described. The manufacture process is greatly facilitated by providing these openings in the nozzle member itself rather than that they be formed in the tank. The ribs between openings are imperatively necessary to provide the necessary strength.

The material of the tank at the position of the arcuate depression 48 forms a thin diaphragm of arcuate cross section, as shown, which is opposite the arcuate depression 40 in the nozzle 18 as previously described. An elongated shaped charge (not shown) is positioned along the length of the bottom of the arcuate recess 40 in the nozzle, that is, in a position along the thin diaphragm 48a formed in the part 26 of the tank 14 as described. The shaped charge may be of a known commercial type marketed as Linear Shaped Charge.

The construction of the container and nozzle so far described corresponds to that in the companion application Ser. No. 57,525 filed on July 23, 1970, now U.S. Pat. No. 3,647,999 issued on Mar. 7, 1972, this patent having common ownership with the present application.

The nozzle 18 as may be seen in FIGS. 2 and 5 is constructed as a plural or dual nozzle. Between the sides of the nozzle 18 there is an intermediate septum designated at 66 which in effect makes it a dual nozzle. Bag 16 has the peripheral edges of its opening secured to the outside peripheral edges of the nozzle as will be described in more detail presently. The side parts of the nozzle are designated at 68 and 68a. The bag 16a has the peripheral edges of its opening secured to the peripheral edges of the side 68a of the nozzle and the septum 66 as may be observed in FIG. 5. Provided in septum 66 is an angular slot opening 72 in which is fitted a flutter valve shown more in detail in FIG. 4. The flutter valve comprises an elongated channel member 74 having a peripheral flange 76. The channel member 74 fits into the slot 72, and the flange 76 is flush against the surface of the septum 66. Attached to the end of the channel member 74 is the flutter valve, as designated at 80, which is of cross sectional shape to fit over the channel member 74. It may be made of a suitable material such as neoprene coated nylon, and extending from its two sides are flexible lips 82 and 84 which normally lie flush against each other, but which can be opened by pressure to allow gas or air to flow through the flutter valve and into the smaller bag 16a. The flutter valve, of course, prevents return of air from the bag 16a to the nozzle. Adjacent to the opening in the member 74 is a vane 86 extending from the septum 66 positioned to form a baffle whereby air or gas passing from the tank 14 through the nozzle is deflected and caused to go through the flutter valve 74 into the bag 16a. Thus, it may be seen that the bag 16a may be inflated at the same time as bag 16.

The system is provided with means whereby the bag 16 is assisted in inflation by aspirating air into it. The purpose of this is to make it possible to reduce the size of the pressure tank or vessel required for inflation purposes. The aspirator is in the form of an aspirator flutter valve provided in a side of the bag 16. It is designated generally by the numeral 90, and it is shown in more detail in FIG. 6. An elongated flat frame 92 is provided on the outside of the bag 16 and a similar elongated frame 94 is provided on the inside, these frames circumscribing the aspirator opening 96 in the bag 16. The frame 94 has an inwardly extending flange 100. Numeral 102 designates the flutter valve member having a shape to receive and be engaged on flange 100 which is continuous as shown in FIG. 5. Extending from the frame member 94 are vanes or baffle members 106 which extend into the flutter valve 102. The side parts of the flutter valve 102 are extended as shown at 110 and 112, these parts normally lying flush against each other but being operable to separate to allow gas or air to pass through into the bag 16 without permitting it to pass in the opposite direction.

In the operation of the aspirator flutter valve, it is to be pointed out that when the system is fired it is by detonating the shaped charge to allow transfer of gas from the tank through the nozzle into the bag; and there is a shock wave which is such as to produce a virtual vacuum in the bag 16 for the first few milliseconds. At this time, there is atmospheric pressure of approximately 15 lbs. per square inch in the vehicle outside the bag. Thus, during the first few milliseconds of perhaps 15 or 20 milliseconds, the air in the car will be forced through the flutter valve 90 to partly inflate the bag 16. This avoids the necessity of having higher pressures in the tank to inflate the bag, and the total volume of the tank may be less. This construction further serves the purpose of alleviating pressure conditions in the vehicle or in the environment which would otherwise become very high when the bags are inflated. The bag 16 might, for example, have a volume of nine or ten cubic feet and the small bag 16a, a volume of one cubic foot. The size of the openings to the bags can, of course, be readily calculated to determine optimum practical sizes. About 3 feet of cubic air, for example, for inflating the bag 16 might be aspirated through the aspirator valve in the bag during an interval of 15 milliseconds.

Large bag 16 has one or more blow-out patches as designated at 116 in FIG. 1. When a passenger's body is accelerated and hits the bag and starts to compress it, the blow-out patches may blow out at a gauge pressure of 2 pounds per square inch, for example—that is, 2 pounds over atmospheric, thus relieving the pressure.

The inflatable envelopes or bag 16 and 16a can be made of any suitable gas impervious fabric material. Preferably, the bags are secured to the nozzle 18 in the manner illustrated in FIG. 7. The bags can be folded or collapsed in a position adjacent to the outlets of the nozzle 18. Extending completely around the periphery of the nozzle discharge or outlet is formed a rib 120, the end of the septum 66 having a similar rib 123. FIG. 7 is a cross sectional view illustrating the securement of the bags to the sidewall 68a of the nozzle. It will be observed that adjacent to the rib 120 there is an inside groove 122 and an outside groove 124. Edge portions or peripheral edges of the opening of bag 16 are inserted into the peripheral groove 124 around the complete periphery of the nozzle. Then, these edge portions are held in the groove by a continuous flexible member in the groove as designated at 126. Provided in the groove 124 is a metal angle member 130 as shown, the corner of which bears against the fabric of the bag. Groove 122 is a continuous one which extends around the inside of the septum 66 and wall 68a of the nozzle as seen in FIG. 5. The peripheral edges around the opening of bag 16a are fitted into the continuous groove 122; and then inserted into the groove is continuous flexible member 134 which retains the bag edges in the groove. A metal member 136 is provided in the groove bearing against the fabric of the bag as shown in FIG. 7.

From the foregoing, those skilled in the art will readily understand the nature and the construction of the invention and the manner in which it realizes all of the objectives as set forth in the foregoing. The construction is one particularly calculated as set forth in the foregoing to simplify fabrication, production, and assembly and at the same time to improve qualities of the finished product from the standpoint of strength and economy.

The foregoing disclosure is representative of a preferred form of the invention and is to be interpreted in an illustrative rather than in a limiting sense, the invention to be accorded the full scope of the claims appended thereto.

What is claimed is:

1. In a safety device for human protection comprising: an envelope means inflatable with a gas whereby to form a resilient cushion and having an elongate container under pressure with means to provide elongated passageway means along the length of the container for transferring gas from the container to the envelope means for inflation, the improvement comprising there being plural envelopes inflatable from said container and positioned to form protective means for a human, said transfer means comprising a plural transfer nozzle constructed to separately deliver gas to said plural inflatable envelopes, said transfer nozzle having inlet means arranged whereby gas from the container for all of said plural envelopes is received through the same inlet means, said nozzle having an intermediate septum, one envelope being secured to a part of the nozzle on one side of the septum.

2. A device as in claim 1, wherein said septum has a passageway therethrough providing communication from one part of the nozzle to the other.

3. A device as in claim 2, wherein said passageway has a flutter valve associated with it.

4. A device as in claim 1, wherein said one envelope is secured to the nozzle to peripheral edges of the nozzle.

5. In a safety device for human protection comprising: an envelope means inflatable with a gas whereby to form a resilient cushion and having an elongated container under pressure with means to provide elongated passageway means along the length of the container for transferring gas from the container to the envelope means for inflation, the improvement comprising there being plural envelopes inflatable from said container and positioned to form protective means for a human, said transfer means comprising a plural transfer nozzle constructed to separately deliver gas to said plural inflatable envelopes, said transfer nozzle having inlet means arranged whereby gas from the container for all of said plural envelopes is received through the same inlet means, said inflatable envelopes having portions secured to the nozzle, the nozzle having grooves therein and spring retainer means engageable in the grooves whereby to secure edge portions of the envelope between the spring retainer means and the nozzle.

6. In a safety device for human protection having an envelope inflatable with a gas to form a resilient cushion; elongated container means for gas under pressure; means to provide elongated passageways along the length of the container for transferring gas from the container to the envelope for inflating it, the improvement comprising means for aspirating air into the envelope upon initial transfer of gas into it from the container to thereby assist in inflating it, said transfer means comprising a nozzle constructed to have plural discharge outlets having said envelope connected to one of said outlets and a second envelope connected to the other outlet and means whereby gas can be transferred from one of said nozzle outlets to the other.

* * * * *